United States Patent
Anders

[15] 3,693,764
[45] Sept. 26, 1972

[54] SPOT-TYPE DISC BRAKE SHOE

[72] Inventor: Hans Joachim Anders, Frankfurt am Main, Germany

[73] Assignee: ITT Industries, Inc., New York, N.Y.

[22] Filed: Jan. 21, 1971

[21] Appl. No.: 108,649

[30] Foreign Application Priority Data

Feb. 21, 1970 Germany..........P 20 08 057.3

[52] U.S. Cl..............................................188/73.1
[51] Int. Cl................................................F16d 65/02
[58] Field of Search..........188/73.1, 73.2, 73.3, 73.4, 188/250 B; 192/107 M, 109 A, 115

[56] References Cited

UNITED STATES PATENTS

| 3,563,347 | 2/1971 | Hahm | 188/73.1 |
| 3,275,105 | 9/1966 | Petit | 188/250 B |
| 3,037,860 | 6/1962 | Masterson et al. | 192/107 M UX |
| 3,113,643 | 12/1963 | Botterill | 188/72.5 |
| 3,027,979 | 4/1962 | Pocock | 188/73.1 |

Primary Examiner—Joseph Wegbreit
Attorney—C. Cornell Remson, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

A brake shoe for spot-type disc brakes wherein a backing plate is formed with at least two projections, one extending further than the other, at the opposite lateral edges of the plate to which the friction lining is bonded. As a piston drives the backing plate and lining toward a brake disc, the lining is gradually worn away until the metal of the further extending projection comes into contact with the metal of the disc, thereby providing an audible squeal or warning signal to the vehicle operator while there is still enough brake lining remaining to provide adequate stopping power.

1 Claim, 3 Drawing Figures

PATENTED SEP 26 1972 3,693,764

Inventor
HANS-JOACHIM ANDERS
By Herbert Stern
Attorney

SPOT-TYPE DISC BRAKE SHOE

CROSS REFERENCE TO RELATED APPLICATIONS

This invention is related to U.S. patent application No. 782,849 entitled DISC-BRAKE SHOE by H. J. Anders and assigned to the assignee of the present invention.

BACKGROUND OF THE INVENTION

This invention relates to brake shoes for spot-type disc brakes and more particularly to such a brake shoe which provides an audible indication of brake wear.

Brake shoes for spot-type disc brakes of the type well known in the art normally are either incapable of providing an indication to an operator that the brake linings are in need of replacement, or alternatively, if the brake shoes are so constructed that a warning is provided, the construction of the brake shoe is complex and expensive.

SUMMARY OF THE INVENTION

Therefore, the main object of this invention is to provide a brake shoe for spot-type disc brakes which automatically alerts an operator when the brake linings are worn to the extent that they should be replaced.

It is a further object of this invention to provide a brake shoe for spot-type disc brakes which ensures even wear over the total surface of the brake linings.

It is yet another object of this invention to provide brake shoes which are inexpensive to manufacture.

It is a feature of this invention to provide such a brake shoe wherein the means for automatically alerting the operator is an audible signal.

According to the present invention, there is provided a spot-type disc brake shoe comprising a backing plate formed with a plurality of projections on one face thereof, a first projection located adjacent one edge of said plate and projecting a first distance from said one face, a second projection located adjacent another lateral edge of said plate opposite said lateral edge and projecting a second distance, greater than said first distance, from said one face, and a friction lining attached to said plate at said projections.

DESCRIPTION OF THE PREFERRED EMBODIMENT

Figure 1:
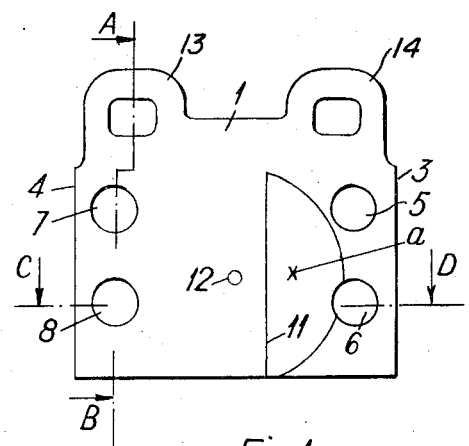
FIG. 1 shows a plan view of a preferred embodiment of the backing plate forming part of the subject brake shoe.
Figure 3:
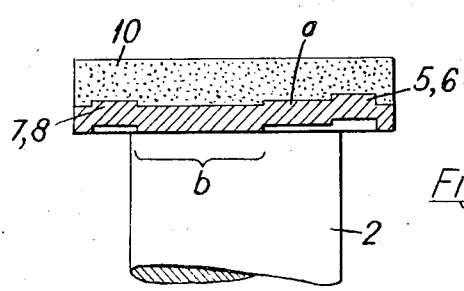
FIG. 3 is a cross-sectional view of the brake shoe along C – D of FIG. 1 further illustrating a piston which may be used to apply pressure to said backing plate.

Referring now to FIG. 1, there is shown a backing plate 1 which is part of a brake shoe, the plate being seen from the point of view of an actuating member such as a piston 2, seen more clearly in FIG. 3. The plate 1 is formed with depressions or cavities 5, 6, 7, 8 and a, which result from the plate being formed with offset portions, the depressions 5, 6, 7, 8 and a having corresponding projections, similarly numbered, on the side of the plate 1 opposite piston 2, the opposite side being attached to a friction brake lining 10 as more clearly seen in FIG. 3. The support and guide structure for the brake shoe as well as the construction of the rest of the disc brake assembly and actuator are well known in the art and are therefore not described in detail herein. These details can be found in a number of U.S. patents of which U.S. Pat. Nos. 3,478,844; 3,476,222 and 3,371,753 are representative. The brake shoe is supported in a radial direction with respect to the disc (not shown) by means of the lugs 13 and 14 on the backing plate which are provided with holes through which guide pins pass. The holes of the guide lugs are somewhat elongated thereby allowing the brake shoe to rotate about a radial axis.

Offset portions 7 and 8 are located adjacent lateral edge 4 of plate 1 while offset portions 5 and 6 are located adjacent lateral edge 3 of plate 1. Offset portion a, which is illustrated as having a semicircular configuration has a "bending line" 11 which is offset from the center of gravity 12 of plate 1 in the direction of offset portions 5 and 6.

Figure 2:
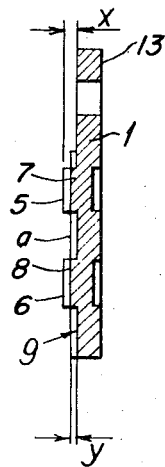
FIG. 2 is a cross-sectional view of the backing plate along A – B of FIG. 1.

Referring now more specifically to FIG. 2, projections 7 and 8 extend a distance y from the essentially even surface line of plate 1, whereas projections 5 and 6 extend a distance x from surface 9, distance x being greater than distance y. This may also be seen by referring to FIG. 3 where it will further be seen that offset portion a projects a distance approximately equal to y above one surface of the plate as do projections 7 and 8, while it is depressed from the side of the plate facing piston 2 by a distance y as is true of offset portions 7 and 8. Due to the illustrated configuration of the plate, it is seen that piston 2 exerts force only at that portion of the plate indicated at b, the piston not coming into contact with those portions of the plate offset from the remainder of the plate.

The operation of the subject brake shoe does not differ from that of prior brake shoes as long as the friction brake linings are not worn. However, when the lining 10 is worn to the extent that projecting portions 5 and 6 contact the brake disc, the metal projection will come into contact with the metal brake disc causing an audible signal in the form of a squealing noise. The brake shoe will tilt about bending line 11 and will therefore cause the remainder of lining 10 to wear in a wedge-shaped manner thereby providing for even wear of the remaining brake lining.

Thus the operator of the motor vehicle has been provided with an audible signal indicating brake wear but does not have to fear a sudden failure of the brakes since there is still enough lining material left to provide satisfactory braking operation. If the squealing noise is ignored, and the wearing process allowed to continue, there will be a gradual reduction of the braking effect, and this can be considered as a further warning to the operator that the linings need to be replaced.

While the principles of the invention have been described in connection with specific apparatus, it is to be clearly understood that this description is made only by way of example and not as a limitation to the scope of the invention as set forth in the objects thereof and in the accompanying claims.

I claim:

1. A spot-type disc brake shoe comprising:

a backing plate formed with a plurality of projections on one face thereof;

said projections including a first pair of spaced projections located adjacent one lateral edge of said plate and projecting a first distance from said one face;

a second pair of spaced projections located adjacent a lateral edge of said plate opposite said one lateral edge and projecting a second distance greater than said first distance from said one face; and a third projection located between said first and second pair of spaced projections adjacent said second pair of spaced projections and offset with respect to the center of gravity of said plate, said third projection having a semicircular configuration with the diameter thereof being parallel to said lateral edges adjacent said center of gravity with the curvature of said third projection extending toward said second pair of spaced projection, said third projection extending said first distance from said one face;

a friction lining attached to said plate on said one face and covering said projections;

the face of said plate opposite said one face having cavities therein corresponding to the position of said projections; and actuating means being positioned to encompass at least a portion of said cavities and to contact said face of said plate opposite said one face between said cavities corresponding to said first pair of spaced projections and said third projection;

said second pair of spaced projections causing an audible noise when said lining is worn off said second pair of spaced projections to indicate brake shoe wear and said brake shoe tilts about said diameter of said third projection to provide even wear of the remainder of said brake lining.

* * * * *